United States Patent
Fletcher et al.

[11] Patent Number: 6,141,212
[45] Date of Patent: *Oct. 31, 2000

[54] METHOD AND APPARATUS FOR CONNECTING PERIPHERALS HAVING VARIOUS SIZE PLUGS AND FUNCTIONS

[75] Inventors: Peter W. Fletcher, Saratoga; Glen D. Stone, San Jose, both of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,057

[22] Filed: Feb. 14, 1997

[51] Int. Cl.[7] .................................. G06F 1/16; H05K 7/02
[52] U.S. Cl. ............................................ 361/686; 439/218
[58] Field of Search ..................... 361/686, 822, 361/823; 439/638, 657, 668, 218

[56] References Cited

U.S. PATENT DOCUMENTS

| | | | |
|---|---|---|---|
| 4,804,336 | 2/1989 | Miller et al. | 439/218 |
| 4,874,330 | 10/1989 | Bogese, II et al. | 439/418 |
| 5,096,441 | 3/1992 | Jaag | 439/676 |
| 5,302,141 | 4/1994 | O'Reilly et al. | 439/680 |
| 5,382,182 | 1/1995 | Shen et al. | 439/676 |
| 5,387,135 | 2/1995 | Shen et al. | 439/676 |
| 5,501,608 | 3/1996 | Scheer et al. | 439/218 |
| 5,617,291 | 4/1997 | Fujii et al. | 361/686 |
| 5,623,514 | 4/1997 | Arai | 375/222 |
| 5,660,568 | 8/1997 | Moshayedi | 439/654 |
| 5,676,567 | 10/1997 | Gluskoter et al. | 439/638 |
| 5,748,443 | 5/1998 | Flint et al. | 361/686 |
| 5,865,651 | 2/1999 | Dague et al. | 439/680 |

FOREIGN PATENT DOCUMENTS 3-244013  10/1991  Japan  .................................. G06F 1/16

OTHER PUBLICATIONS

*Modular Jacks and Plugs* catalog descriptions: FCC 68 Modular Plug—90075, Modular Jack—95009–Right Angle Standard Profile, and Shielded Modular Jack—95122–Right Angle Surface Mount Version, Molex Incorporated, no date.

Primary Examiner—Lynn D. Feild
Attorney, Agent, or Firm—Beyer Weaver & Thomas, LLP

[57] ABSTRACT

A multiple function peripheral connecting device that allows more functionality in the limited port space of a computer is disclosed. The connecting device provides the capability for external devices having different functions to be connected to the computer through a single port. This is accomplished by wiring a first function, internal to the computer, to certain pins of a modular connector, and wiring a second function, also internal to the computer, to a certain different combination of pins on the same modular connector. Because differently sized plugs can fit with the modular connector, peripherals associated with different types of systems can connect with the computer through the same single jack. Also, an adapter may be connected to the computer to allow simultaneous use of the two internal functions.

24 Claims, 7 Drawing Sheets

METHOD AND APPARATUS FOR
CONNECTING PERIPHERALS HAVING
VARIOUS SIZE PLUGS AND FUNCTIONS

BACKGROUND OF THE INVENTION

1. Field of the Invention

The present invention relates generally to connecting external devices and systems to a computer, and more particularly, to connecting external devices and systems having different functions to a computer using a shared port/connector.

2. Description of the Related Art

The usefulness of a computer can be increased through devices and systems that can be connected to the computer. To accommodate such interconnection, computers commonly are equipped with various ports through which external devices can be connected to the computer. These external devices and systems may include, among others, printers, modems, local area networks (LANs), external drives, keyboards, and pointing devices. In turn, internal boards of the computer include wiring connected to each port that gives the computer the capability to utilize the external device which is connected to that port.

FIG. 1 depicts a conventional computer system 100 configured to connect with two different external devices or systems to thereby operate two different functions. Two functions which are greatly needed in the majority of today's computers are ethernet and modem capability. The ethernet function is required for networking with other computers, and the modem function is required, for example, for sending facsimiles from the computer and for connecting the computer system to the Internet. Because of the widespread use of these functions in today's households and workplaces, inclusion of these features are often essential to the marketability of the computer system.

FIG. 1 more specifically depicts a computer system 100 that accommodates interconnection with a 10baseT ethernet system and a telephone system. A signal from an ethernet system (not shown) is carried via an ethernet line 110 terminating in an ethernet 8-pin modular plug 108. Although the ethernet 8-pin modular plug 108 has eight ethernet plug pins 118, only four, typically pins numbered as 1, 2, 3, and 6 in FIG. 1, are connected to the ethernet line 110. To accommodate connection with the ethernet system, the computer system 100 includes an ethernet circuit 102. The ethernet circuit 102 is connected to an ethernet 8-pin modular jack 106 which provides a port on the edge of the computer system 100. To connect the computer system 100 to the ethernet line 110, the ethernet 8-pin modular plug 108 is inserted into and engaged with the ethernet 8-pin modular jack 106. Therefore, only four of the ethernet modular jack pins 120, those corresponding to the pins used on the ethernet 8-pin modular plug 108, are used on the ethernet 8-pin modular jack 106.

A signal from a telephone system (not shown) is carried via a telephone line 116 terminating in a 4-pin telephone plug 114. As with the ethernet 8-pin modular plug 108, not all of the telephone plug pins 122 on the telephone 4-pin modular plug 114 are used. Rather, the telephone line 116 typically uses only pins 2 and 3. To accommodate connection with the telephone system, the computer system 100 also includes a modem circuit 104. The modem circuit 104 is connected to a telephone 4-pin modular jack 112 which provides another port on the edge of the computer system 100, thus further decreasing the space available for other such ports. To connect the computer system 100 to the telephone line 116, the telephone 4-pin modular plug 114 is inserted into and engaged with the telephone 4-pin modular jack 112. Therefore, the modem circuit 104 is connected to those telephone modular jack pins 122 which correspond to the two pins used on the telephone 4-pin modular jack 112.

As shown in FIG. 1, typical configurations of computer systems may include both ethernet and modem capability which requires the use of two ports. Other ports are also needed for other external device or system functions desired. Each port required increases the amount of surface area required, and correspondingly decreases the amount of surface area available for other ports. Typically, desktop computer systems have a fairly large surface area that can be used for such ports, and therefore the designer is free to include many ports, and therefore functions, in desktop computer systems.

However, due to convenience and cosmetic reasons, computers are built such that they normally only use the back side of their housing for ports. Hence, there is a limited surface area available for ports. In the case of portable computers, the limited surface area is more restrictive because portable computers must be limited in overall size and must be easily carried to be useful. With such limited space available for ports, the computer designers are forced to limit the number of external devices that can be connected to the computer, and thus limit the functionality of the computer. The designer is forced to make difficult choices not to include some functions, thus making the computer system less marketable. Also, the consuming public demands continued reduction in the size of computers, in particular portable computers. Such continued reduction of overall size results in even further reduction in the surface area available for ports and in the number of functions available with the computer.

Thus, there is a need for better utilization of the limited surface area available for ports on computers.

SUMMARY OF THE INVENTION

Generally, the present invention is a multiple function peripheral connecting device that allows more functionality in the limited area for ports on a computer. More specifically, the present invention provides the capability for external devices having different functions to be connected to the computer through a single port. This is accomplished by wiring a first function, internal to the computer, to certain pins of a modular connector, and wiring a second function, also internal to the computer, to other pins on the same modular connector. The present invention is particularly well suited for use with a portable computer.

One embodiment of the present invention provides external connection through one port for both ethernet and modem functions. To accomplish this, the ethernet function within the computer is wired to certain pins on an 8-pin modular jack, and the modem function within the computer is wired to different pins on the same 8-pin modular jack. Because both an 8-pin modular plug used by an ethernet system, and a 4-pin modular plug used in phone systems both fit into an 8-pin modular jack, less space is used by the present invention than if separate jacks were used for the two functions. Furthermore, when the 8-pin modular plug is inserted into the 8-pin modular jack, the ethernet function is automatically activated, and when the 4-pin modular plug is inserted into the 8-pin modular jack, the modem function is automatically activated, without use of additional hardware.

In a second embodiment of the present invention an adapter couples with the computer system of the first embodiment, allowing simultaneous use of the two functions which are connected to different pins of the 8-pin modular jack.

These and other features and advantages of the present invention will become apparent upon reading the following detailed descriptions and studying the various figures of the drawings.

BRIEF DESCRIPTION OF THE DRAWINGS

The present invention will be readily understood by the following detailed description in conjunction with the accompanying drawings, wherein like reference numerals designate like structural elements, and in which:

FIG. 3b is a diagram illustrating the connection of the ethernet plug and computer system shown in FIG. 3a.

FIG. 4b is a diagram illustrating the connection of the telephone plug and computer system shown in FIG. 4a.

DETAILED DESCRIPTION OF THE INVENTION

Embodiments of the invention are discussed below with reference to FIGS. 2–5.

Telecommunications equipment has benefited from the design of electrical plugs and receptacles (jacks) that provide easy connect/disconnect capability between electrical circuits within the telecommunications equipment. Such plugs and jacks, commonly referred to as modular plugs and jacks, are particularly popular in association with telephone sets where they were first used. Modular plugs and jacks have been so well received that their specifications are standardized, and can be found in Subpart F of the FCC-Part 68.500 Registration Rules.

Modular jacks provide a convenient means for connecting and disconnecting telephone equipment, telecommunications equipment, and computer-related equipment. Common modular jacks conventionally comprise between two and eight contacts, or pins, embedded within a generally rectangular plastic housing having a cavity capable of receiving a modular plug. The modular jacks may also have more than eight contacts or pins. Portions of each contact are exposed within the cavity, thus allowing electrical connection to corresponding contacts on a modular plug. In addition, attachment portions of each contact extend beyond the housing, allowing electrical connection between the jack contacts and a printed circuit board or the like. Thus, connecting a plug and jack, both having corresponding contacts connected to their respective devices or systems, allows electrical connection between the two devices or systems.

The design standardization of common modular jacks allows equipment utilizing such jacks to be interchangeably connected to a single plug. For example, using such designs for telephone plugs and jacks allows phone units to be moved from room to room or from house to house without requiring modification of the corresponding receptacles. Another benefit of such design standardization is that it enables jacks to receive any plug having fewer pins than the jack includes. Thus, an 8-pin jack could alternately receive either an 8-pin plug or a 4-pin plug.

Figure 2:
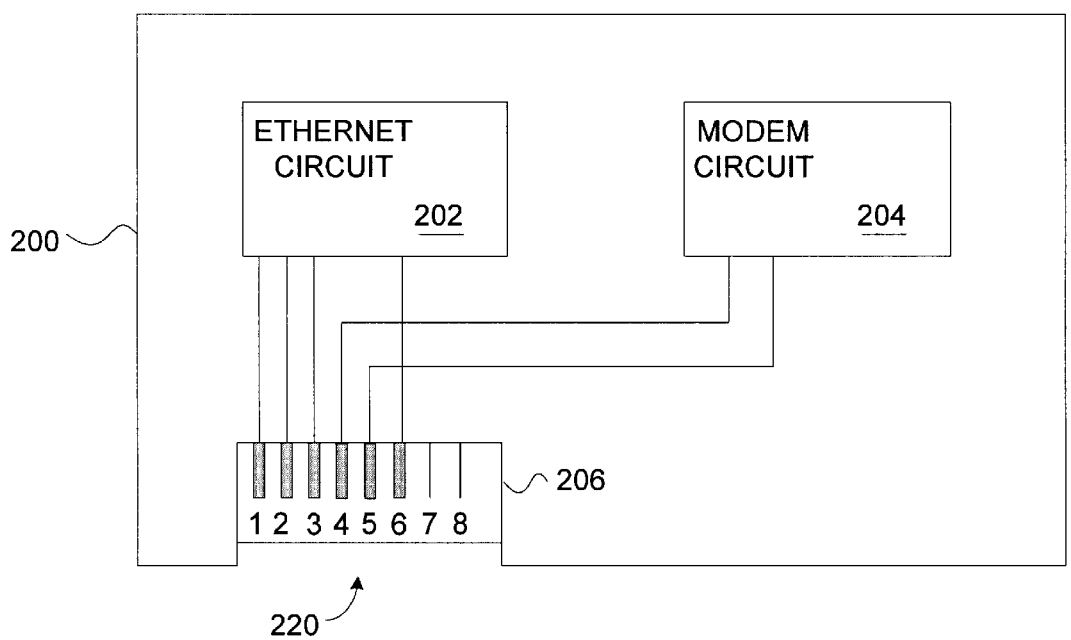
FIG. 2 is a diagram illustrating a computer system incorporating a first embodiment of the present invention.

FIG. 2 is a diagram illustrating a computer system 200 incorporating a first embodiment of the present invention. Computer system 200 includes an ethernet circuit 202, a modem circuit 204, and an 8-pin modular jack 206 with pins 1, 2, 3, and 6 of the pins 220 coupled to the ethernet circuit 202, and with pins 4 and 5 of the pins 220 coupled to the modem circuit 204.

Figure 3A:
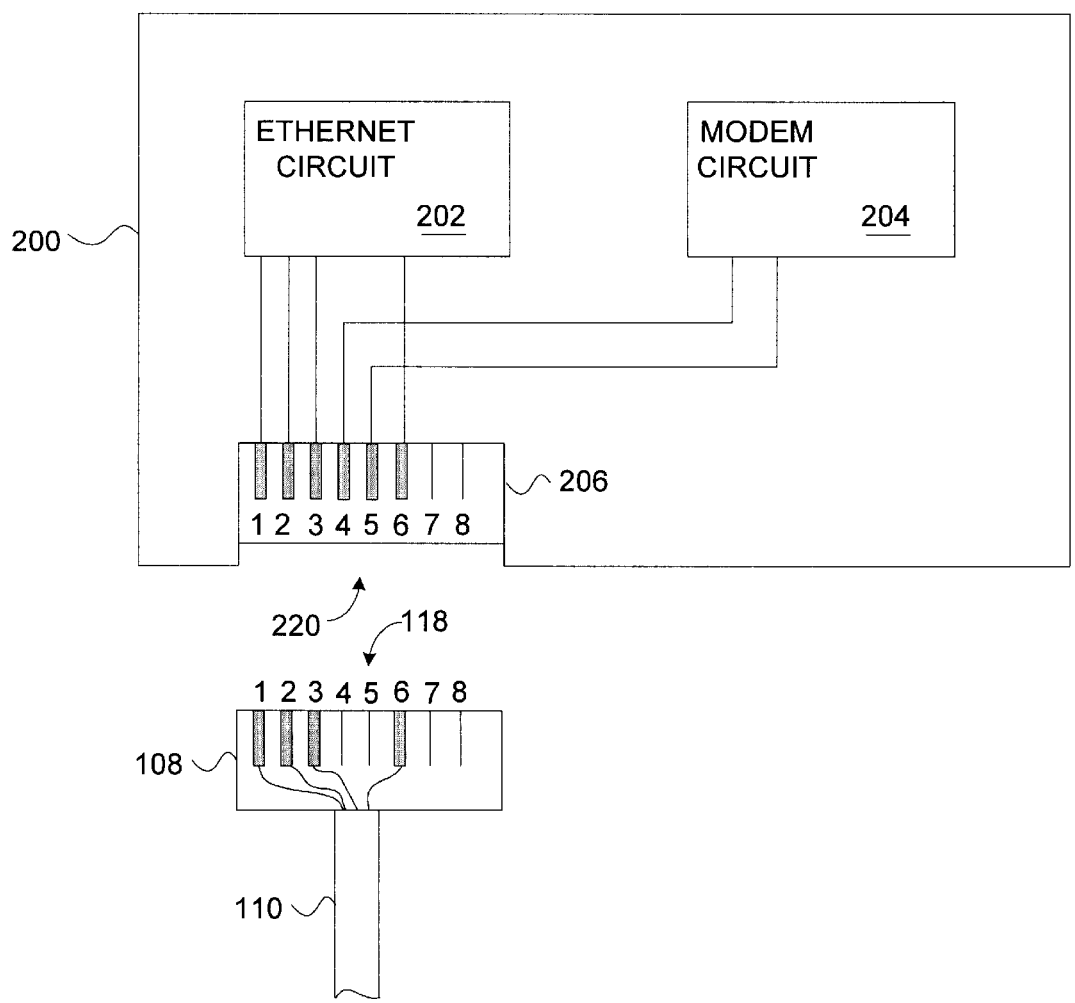
FIG. 3a is a diagram illustrating an ethernet system plug aligned with the computer system shown in FIG. 2.

FIG. 3a illustrates how the computer system 200 according to the first embodiment of the present invention accommodates interconnection with an external ethernet system (not shown). Two commonly used ethernet systems are 10baseT and 100baseTX each of which typically use four lines, two for transmit and two for receive, and an 8-pin modular plug. Therefore, for 10baseT or 100baseTX four of the pins 118 of an ethernet 8-pin modular plug 108 are used, typically those numbered 1, 2, 3 and 6 with two pins being transmit pins and two being receive pins.

Because of the standard construction of the 8-pin modular jack 206, it can receive the ethernet 8-pin modular plug 108. Two of the pins 220 (selected from the pins numbered 1, 2, 3 and 6) of the 8-pin modular jack 206, that correspond to the transmit pins of the ethernet 8-pin modular plug 108 are electrically connected to that portion of the ethernet circuit 202 performing transmit functions, while the two other of the pins 220 that correspond to the receive pins of the ethernet 8-pin modular plug 108 are electrically connected to that portion of the ethernet circuit 202 performing receive functions.

Figure 3B:
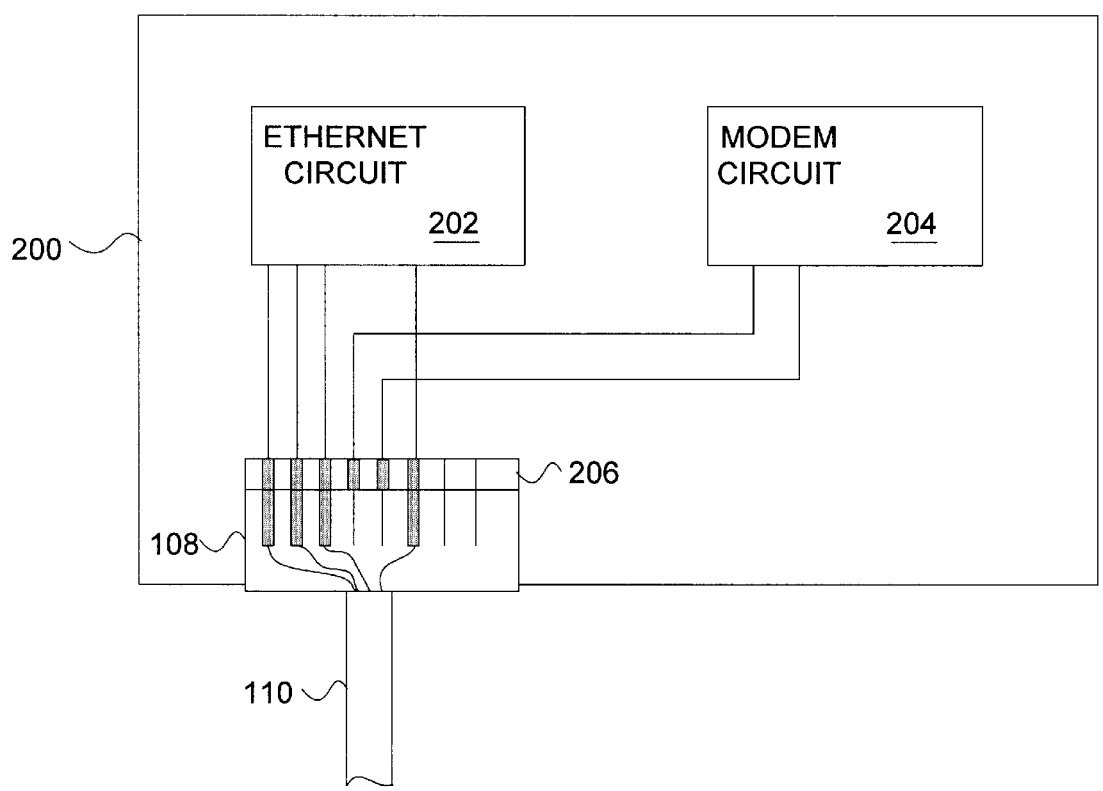

Thus, because the ethernet circuit 202 and the ethernet system are connected to the same pins on the 8-pin modular jack 206 and the ethernet 8-pin modular plug 108, respectively, when the ethernet 8-pin modular plug 108 is inserted into the 8-pin modular jack 206, as shown in FIG. 3b, the ethernet circuit 202 is coupled with the external ethernet system carried via the ethernet line 110. Thereafter, the ethernet function is able to operate in a manner similar to that in a conventional computer system.

Figure 4A:
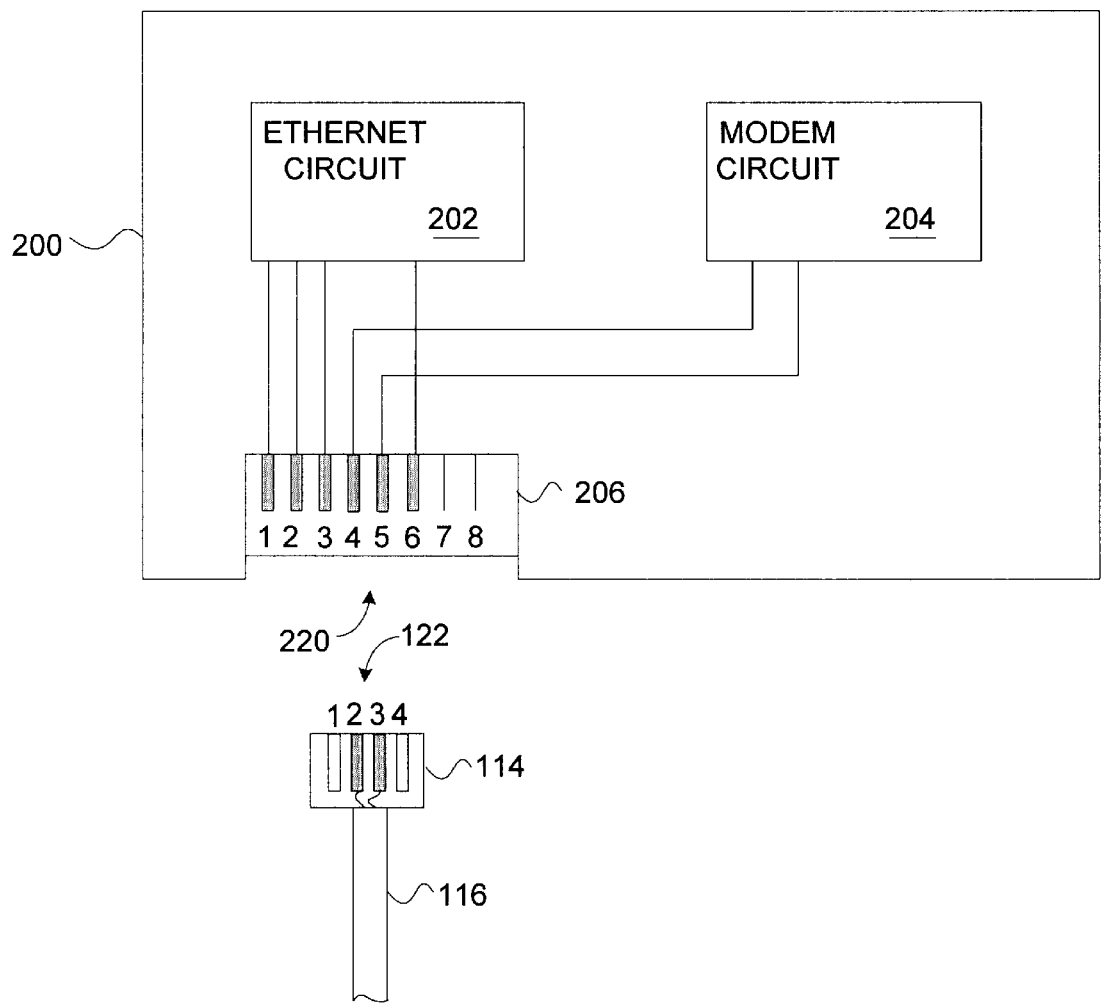
FIG. 4a is a diagram illustrating a telephone system plug aligned with the computer system shown in FIG. 2.

FIG. 4a is diagram illustrating how the computer system 200 according to the first embodiment of the present invention accommodates interconnection with an external telephone system (not shown). A typical telephone system uses two lines, commonly referred to as "tip" and "ring", and a 4-pin modular plug. Therefore, for such a telephone system, only two of the set of pins 122 of a telephone 4-pin modular plug 114 are used, typically the center pins numbered 2 and 3 with one pin being connected to the "tip" line and the other with the "ring" line.

Figure 1:
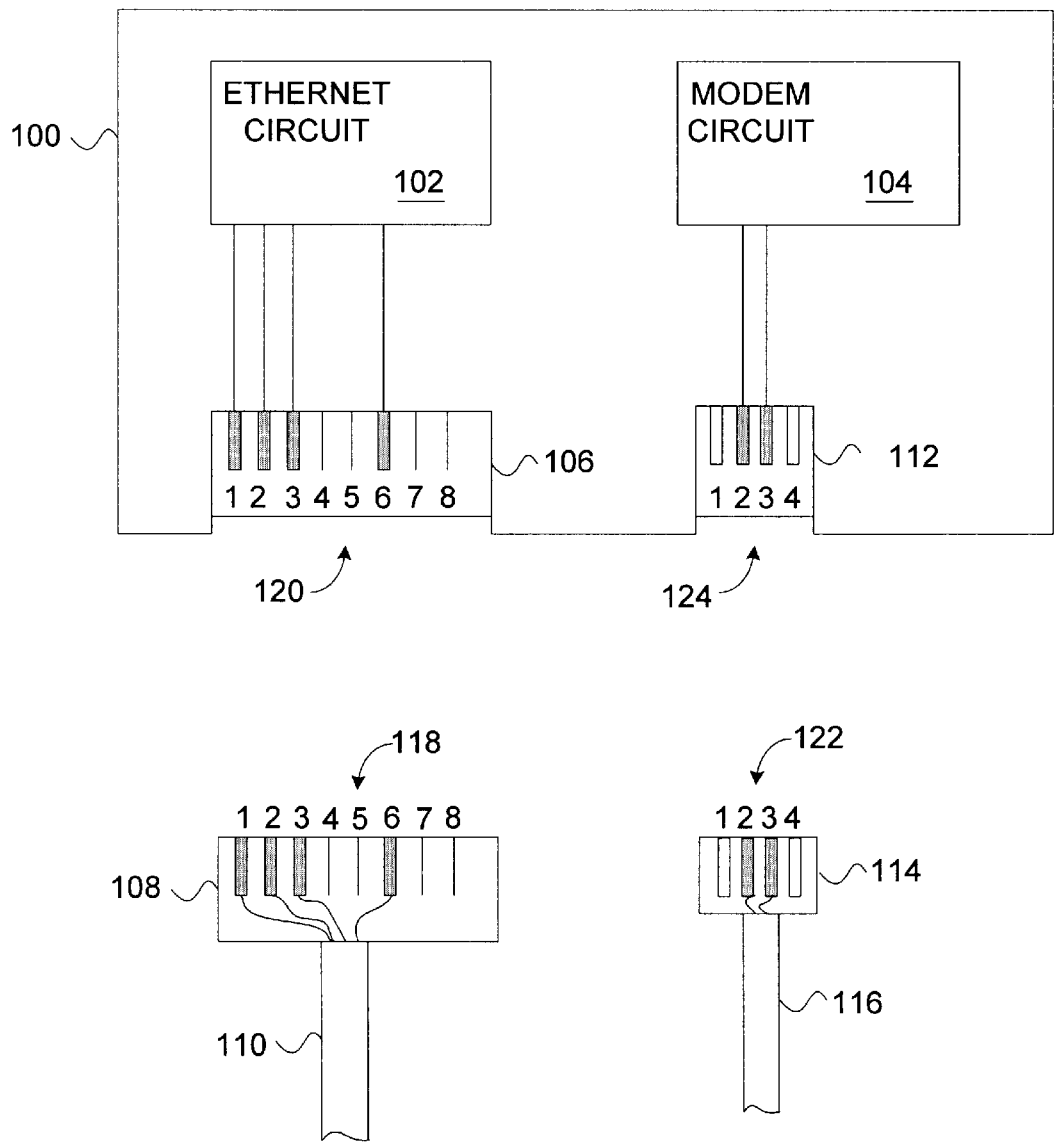
FIG. 1 is a diagram illustrating a conventional computer system.

In the first embodiment of the present invention, instead of including a second modular jack on the computer system 200 to provide a port through which the telephone line and modem circuit can connect, such as the modem 4-pin modular jack 112 does in the conventional computer system 100 shown in FIG. 1, the modem circuit 204 is connected to the 8-pin modular jack 206. More specifically, the modem circuit 204 is connected to the two center pins of the 8-pin modular jack pins 220. Although the telephone 4-pin modular plug 114 and the 8-pin modular jack 206 are of different sizes, the standard construction of an 8-pin modular jack and a 4-pin modular plug are such that it allows a 4-pin. modular plug to be inserted to the center of an 8-pin modular jack.

Figure 4B:
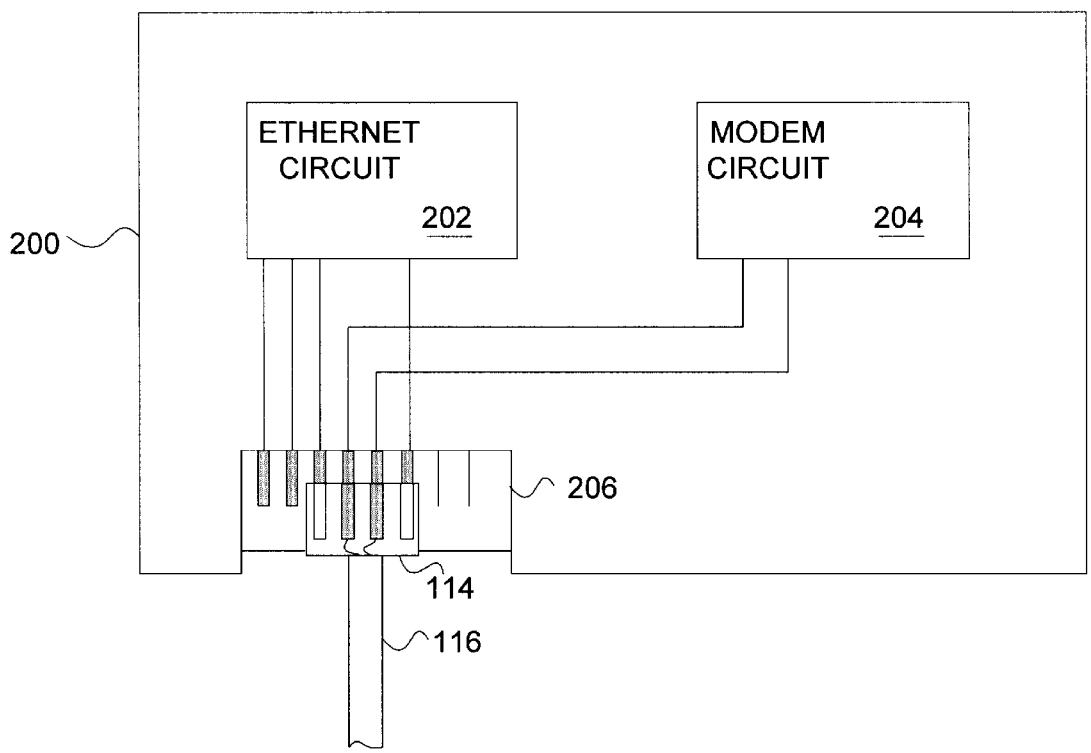

Therefore, when the telephone 4-pin modular plug 114 is inserted to the 8-pin modular jack 206 of the present invention, as shown in FIG. 4b, the external telephone system is coupled to modem circuit 204.

Thus, by using standard parts, this embodiment of the present invention maintains the same level of peripheral functionality while reducing the number of parts used. Also, this is accomplished while reducing the amount of surface area of the computer required to support the peripheral functionality, thereby leaving more surface area available for the incorporation of other functions and their corresponding ports. Therefore, the options of the designer are expanded, and a more marketable computer is developed at lower cost.

Figure 5:
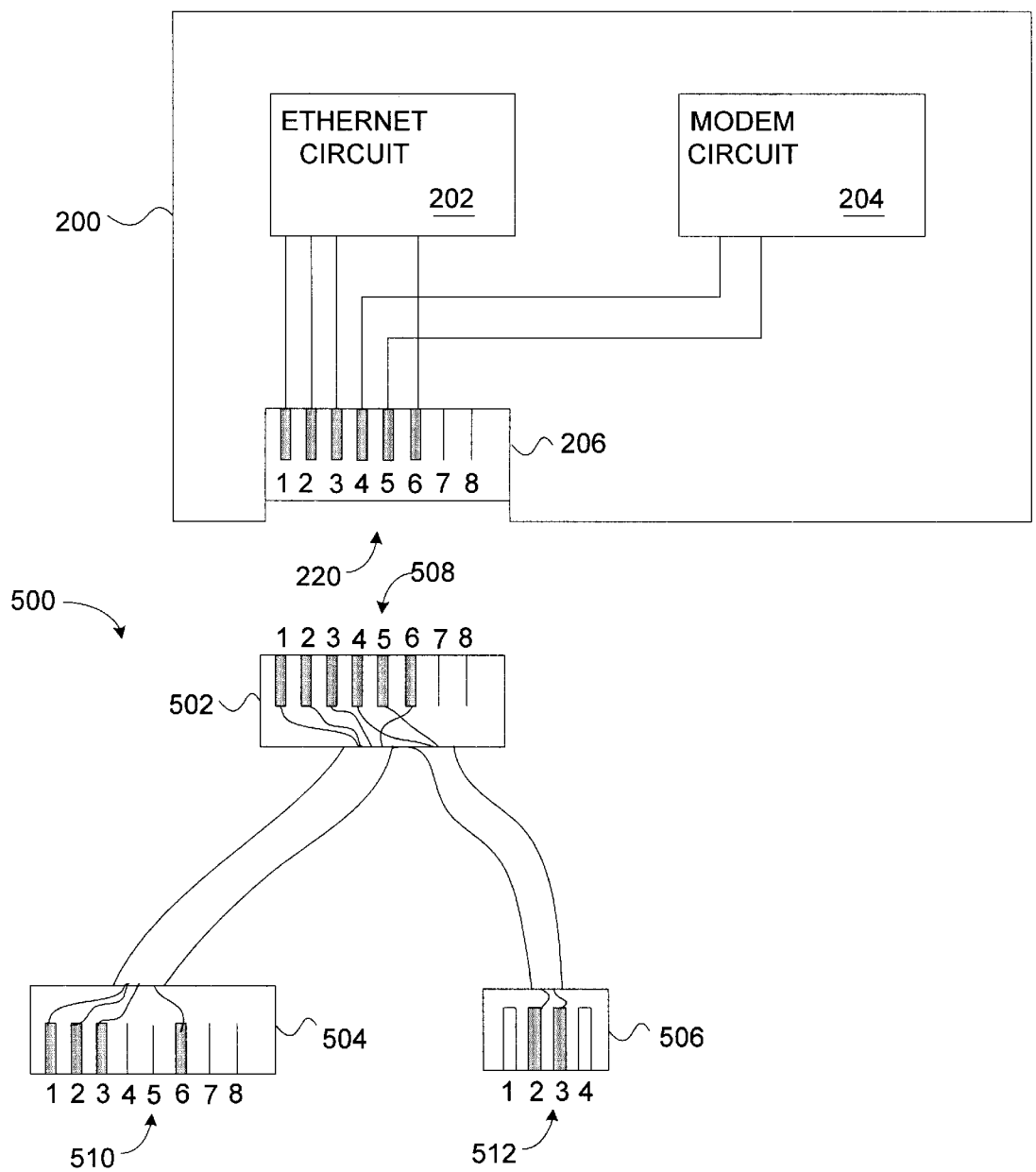
FIG. 5 is a diagram illustrating an adapter, according to a second embodiment of the present invention, used with the computer system shown in FIG. 2.

FIG. 5 illustrates a second embodiment of the present invention, in which an adapter 500 couples to the computer system 200 described above to provide additional peripheral functionality. Adapter 500 includes an 8-pin modular plug 502, an 8-pin modular jack 504, and a 4-pin modular jack 506. Pins 1, 2, 3, and 6 of pins 508 on the 8-pin modular plug 502 are electrically coupled with pins 1, 2, 3 and 6 of pins 510 on the 8-pin modular jack 504. Further, pins 4 and 5 of pins 508 are coupled with pins 2 and 3 of pins 512 on 4-pin modular jack 506. Thus, when the 8-pin modular plug 502 is connected to the 8-pin modular jack 206, the ethernet circuit 202 is electrically connected to pins 1, 2, 3 and 6 of the 8-pin modular jack 504, and the modem circuit 204 is electrically connected to the center pins of the 4-pin modular jack 506. Therefore, by using the adapter 500, both an ethernet system using pins 1, 2, 3 and 6 of an 8-pin plug and a telephone system using the two center pins of a 4-pin plug can be connected to the computer system 200 and utilized simultaneously. Thus, the second embodiment of the present invention provides, at a low cost, a computer having the ability to simultaneously interact with both ethernet and telephone systems, while also having available surface area for other ports.

In the embodiments described above, the two systems that utilize the same 8-pin modular jack on the computer system of the present invention are an ethernet system (e.g., 10baseT or 100baseTX) and a modem system. However, the present invention provides connection for other combinations of peripheral functions as well. For example, a computer system including a modem circuit and an ATM Forum Standard circuit will operate according to the present invention through electrical connection to pins 4 and 5, and pins 1, 2, 7 and 8, respectively, of an 8-pin modular jack located at a peripheral portion of the computer system. In conjunction with such connection, a standard telephone system using a 4-pin modular jack and an ATM Forum Standard system using an 8-pin modular jack can alternately connect to the same 8-pin modular jack of the computer system.

Likewise, a computer system including a Token Ring LAN circuit and an ATM Forum Standard circuit will also operate according to the present invention when coupled to pins 3, 4, 5 and 6, and to pins 1, 2, 7 and 8, respectively, of an 8-pin modular jack located on a peripheral portion of the computer system. In conjunction with such connection, a Token Ring system using an 8-pin modular jack and an ATM Forum Standard system using an 8-pin modular jack can be alternately connected to the same 8-pin modular jack of the computer system.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A computer system, comprising:

a computer housing;

a first internal circuit associated with performing a first function, said first internal circuit being located within said computer housing;

a second internal circuit associated with performing a second function, said second internal circuit being located within said computer housing; and a connector located on a peripheral portion of said computer housing, said connector being shared by said first and second internal circuits, wherein the first and second functions are different, wherein when a first plug associated with a first external system is received at said connector without an interface device, said first internal circuit is coupled to the first external system, wherein when a second plug associated with a second external system is received at said connector without an interface device, said second internal circuit is coupled to the second external system, wherein said computer system is a portable computer system having a limited surface area on the peripheral portion of said computer housing to support port connectors, including said connector, wherein said connector minimizes the use of the limited surface area by supporting both said first and second internal circuits with a single connector, and wherein the size of the first plug being received at said connector is different than the size of the second plug being received at said connector.

2. A computer system as recited in claim 1, wherein said connector provides electrical connection to either said first internal circuit or said second internal circuit depending on the pin wiring of a plug inserted into said connector.

3. A computer system as recited in claim 2, wherein said connector is an N-pin modular jack, where N is an integer, wherein when an N-pin modular plug is received at said N-pin modular jack, said N-pin modular plug electrically connects to said second internal circuit, and wherein when a 1-upto-N pin plug is received at said N-pin modular jack, said a 1-upto-N pin plug electrically connects to said first internal circuit.

4. A computer system as recited in claim 3, wherein N=8, and wherein pins 4 and 5 of said 8-pin modular jack electrically connect to said first internal circuit, and pins 1, 2, 3 and 6 of said 8-pin modular jack electrically connect to said second internal circuit.

5. A computer system as recited in claim 3, wherein N=8, and wherein pins 4 and 5 of said 8-pin modular jack electrically connect to said first internal circuit, and pins 1, 2, 7 and 8 of said 8-pin modular jack electrically connect to said second internal circuit.

6. A computer system as recited in claim 4, wherein said first internal circuit is a modem circuit and said second internal circuit is an ethernet circuit.

7. A computer system as recited in claim 5, wherein said first internal circuit is a modem circuit and said second internal circuit is an ATM network circuit.

8. A computer system as recited in claim 1, wherein said connector is an 8-pin modular jack, wherein when a first type of 8-pin modular plug is received at said 8-pin modular jack, said first type of 8-pin modular plug electrically connects to said first internal circuit, and wherein when a second type of 8-pin modular plug is received at said 8-pin modular jack, said second type of 8-pin modular plug electrically connects to said second internal circuit.

9. A computer system as recited in claim 8, wherein said first internal circuit is a Token Ring circuit and said second internal circuit is an ATM network circuit.

10. A computer system as recited in claim 1, wherein said connector is a modular jack having a plurality of pins.

11. A computer system as recited in claim 10, wherein said computer system further comprises:

a first set of wires each having a first and second end, the first end of said first set of wires being connected to a first subset of the pins of said modular jack, and the second end of said first set of wires being connected to said first internal circuit;

a second set of wires each having a first and second end, the first end of said second set of wires being connected to a second subset of the pins of said modular jack, and the second end of said second set of wires being connected to said second internal circuit, and wherein each of the pins of the second subset of pins being different from the pins of the first subset of pins.

12. A computer system as recited in claim 11, wherein said modular jack is an 8-pin modular jack.

13. A computer system as recited in claim 11, wherein said first internal circuit is a modem circuit and said second internal circuit is an ethernet circuit.

14. A computer system as recited in claim 11, wherein the first plug is a 4-pin modular plug and the second plug is an 8-pin modular plug.

15. A computer system as recited in claim 11, wherein said computer system is a portable computer system.

16. A computer system as recited in claim 1, wherein said connector is an N-pin modular jack, where N is an integer, wherein when an N-pin modular plug is received at said N-pin modular jack, said N-pin modular plug electrically connects to said first internal circuit, wherein when an N/2-pin modular plug is received at a center portion of said N-pin modular jack, said N/2-pin modular plug electrically connects to said second internal circuit, and wherein said first internal circuit is a networking circuit and said first internal circuit is a modem circuit.

17. A computer system, comprising:

a computer housing;

an internal modem circuit associated with performing a modem function, said internal modem circuit being located within said computer housing;

an internal network circuit associated with performing a network function, said internal network circuit being located within said computer housing; and a modular jack located on a peripheral portion of said computer housing, said modular jack being shared by said internal modem circuit and said internal network circuit, wherein when a first modular plug associated with an external telephone system is received at said modular jack without an interface device, said internal modem circuit is coupled to the external telephone system, wherein when a second modular plug associated with an external network is received at said modular jack without an interface device, said internal network circuit is coupled to the external network, wherein said computer system is a portable computer system having a limited surface area on the peripheral portion of said computer housing to support port connectors, including said modular jack, wherein said modular jack minimizes the use of the limited surface area by supporting both said internal modem circuit and said internal network circuit with a single modular jack, and wherein the size of the first modular plug being received at said connector is different than the size of the second modular plug being received at said connector.

18. A computer system as recited in claim 17, wherein said modular jack is an N-pin modular jack, where N is an integer, wherein when an N-pin modular plug is received at said N-pin modular jack, said N-pin modular plug electrically connects to said internal network circuit, and wherein when an N/2-pin modular plug is received at said N-pin modular jack, said N/2-pin modular plug electrically connects to said internal modem circuit.

19. A computer system as recited in claim 17, wherein said computer system further comprises:

a plurality of pins included in said modular jack;

a first set of wires each having a first and second end, the first end of said first set of wires being connected to a first subset of the pins of said modular jack, and the second end of said first set of wires being connected to said internal modem circuit;

a second set of wires each having a first and second end, the first end of said second set of wires being connected to a second subset of the pins of said modular jack, and the second end of said second set of wires being connected to said internal network circuit, and wherein each of the pins of the second subset of pins being different from the pins of the first subset of pins.

20. A computer system as recited in claim 19, wherein said modular jack is an 8-pin modular jack, wherein the first plug is a 4-pin modular plug and the second plug is an 8-pin modular plug.

21. An electrical device, comprising:

a housing;

a first internal circuit associated with performing a first function, said first internal circuit being located within said housing;

a second internal circuit associated with performing a second function, said second internal circuit being located within said housing; and a connector located on a peripheral portion of said housing, said connector being shared by said first and second internal circuits, wherein the first and second functions are different, wherein when a first plug associated with a first external system is received at said connector without an interface device, said first internal circuit is coupled to the first external system, wherein when a second plug associated with a second external system is received at said connector without an interface device, said second internal circuit is coupled to the second external system, wherein said electrical device has a limited surface area on the peripheral portion of said housing to support port connectors, including said connector, wherein said connector minimizes the use of the limited surface area by supporting both said first and second internal circuits with a single connector, and wherein the size of the first plug being received at said connector is different than the size of the second plug being received at said connector.

22. An electrical device as recited in claim 21, wherein said connector provides electrical connection to either said first internal circuit or said second internal circuit depending on the pin wiring of a plug inserted into said connector.

23. An electrical device as recited in claim 21, wherein said connector is a modular jack having a plurality of pins, wherein said electrical device further comprises:

a first set of wires each having a first and second end, the first end of said first set of wires being connected to a first subset of the pins of said modular jack, and the second end of said first set of wires being connected to said first internal circuit; and a second set of wires each having a first and second end, the first end of said second set of wires being connected to a second subset of the pins of said modular jack, and the second end of said second set of wires being connected to said second internal circuit, and wherein each of the pins of the second subset of pins being different from the pins of the first subset of pins.

24. A computer system, comprising:

a computer housing;

a first internal circuit associated with performing a first function, said first internal circuit being located within said computer housing;

a second internal circuit associated with performing a second function, said second internal circuit being located within said computer housing; and a connector located on a peripheral portion of said computer housing, said connector being shared by said first and second internal circuits, wherein the first and second functions are different, wherein when a first plug associated with a first external system is plugged directly into said connector without an interface device, said first internal circuit is coupled to the first external system, wherein when a second plug associated with a second external system is plugged directly into said connector without an interface device, said second internal circuit is coupled to the second external system, wherein said computer system is a portable computer system having a limited surface area on the peripheral portion of said computer housing to support port connectors, including said connector, wherein said connector minimizes the use of the limited surface area by supporting both said first and second internal circuits with a single connector, and wherein the size of the first plug being plugged into said connector is different than the size of the second plug being plugged into said connector.

* * * * *